United States Patent [19]

McDonald

[11] 3,853,329
[45] Dec. 10, 1974

[54] SURGICAL SUPPLY CART

[75] Inventor: Robert Louis McDonald, Rochester, N.Y.

[73] Assignee: Sybron Corporation, Rochester, N.Y.

[22] Filed: Aug. 23, 1973

[21] Appl. No.: 391,003

[52] U.S. Cl................. 280/47.35, 211/97, 312/329
[51] Int. Cl.............................................. B62b 3/00
[58] Field of Search............. 280/47.34, 47.35, 79.2; 312/326, 329, 209, 250; 211/97, 168, 170; 248/278, 311

[56] References Cited
UNITED STATES PATENTS

| | | | |
|---|---|---|---|
| 1,688,456 | 10/1928 | Dolph | 312/326 UX |
| 1,737,441 | 11/1929 | Ulmer, Jr. | 312/329 |
| 3,001,751 | 9/1961 | Bozik | 248/278 X |
| 3,428,286 | 2/1969 | Del Pesco | 248/278 X |
| 3,428,383 | 2/1969 | Nobel | 312/209 |

OTHER PUBLICATIONS

Advertisement "Electrunite" from "Automotive Industries" August 1, 1953, p. 123.

Primary Examiner—M. Henson Wood, Jr.
Assistant Examiner—John J. Love
Attorney, Agent, or Firm—Theodore B. Roessel; Roger Aceto

[57] ABSTRACT

Disclosed is a surgical supply cart which can be loaded with all the items necessary to perform a particular surgical procedure including the preoperative and a postoperative phases and steam sterilized. The cart has various containers, basins and the like supported on arms extending from the cart, all such containers, etc. being movable to a stored position within the four corners of the cart to form a compact unit for steam sterilizing. In their stored position, the containers are inverted to prevent any accumulation of water within the container during the steam sterilizing procedure.

4 Claims, 3 Drawing Figures

PATENTED DEC 10 1974                3,853,329

SURGICAL SUPPLY CART

BACKGROUND OF THE INVENTION

The present invention relates to a surgical supply cart and more particularly to a cart which can be sterilized while loaded with all the supplies needed for a particular surgical procedure. The cart is also used during the clean-up after surgery.

Presently it is not unusual to gather together on one or several trays, all the various instruments to be used in particular surgical procedure. The trays can either be prepared with sterile instruments or the trays and contents can be sterilized after the instrument are assembled. In any event, these sterile trays of instruments together with the various sterile linen goods whch are needed during the surgical procedure are either manually carried into the operating room or placed on carts and wheeled into the operating room.

It would be desirable to have all the sterilized supplies required for a surgical procedure delivered to the operating room on a single cart, preferably a sterilized car. Accordingly, in the present invention, a cart is provided which can be loaded with unsterile supplies, including instruments and linen and the entire cart and its contents steam sterilized. Once in the operating room, the cart provides the necessary counter surface for the instruments and supplies and is used in the clean-up operation after the surgical procedure.

SUMMARY OF THE INVENTION

The present invention may be characterized in one aspect thereof by the provision of a mobile surgical supply cart having a top and various arms pivoted for movement between a use position extending out from the top and a stored position beneath the top. One or more of the arms carry containers which are inverted when the arms are in the stored position so that the container will not accumulate water during steam sterilization. After being loaded with the various linen and surgical supplies required for a particular surgical procedure, the cart and its contents are steam sterilized. When in use in the operating room, the arms with their attached containers are swung out from under the top for use.

OBJECTS OF THE INVENTION

One object of the present invention is to provide a surgical supply cart which can be loaded with the supplies to be used during a surgical procedure and sterilized.

Another object of the present invention is to provide a surgical supply cart having various containers attached thereto, the containers being movable from an in-use position to an inverted position so as to prevent the containers from catching and accumulating water during steam sterilization.

A further object of the present invention is to provide a surgical supply cart which may be used as a clean-up cart after the surgical procedure.

These and other objects, advantages and characterizing features of the present invention will become more apparent upon consideration of the following detailed description thereof when taken in connection with the accompanying drawings depicting the same.

DESCRIPTION OF THE PREFERRED EMBODIMENTS

Figure 1:
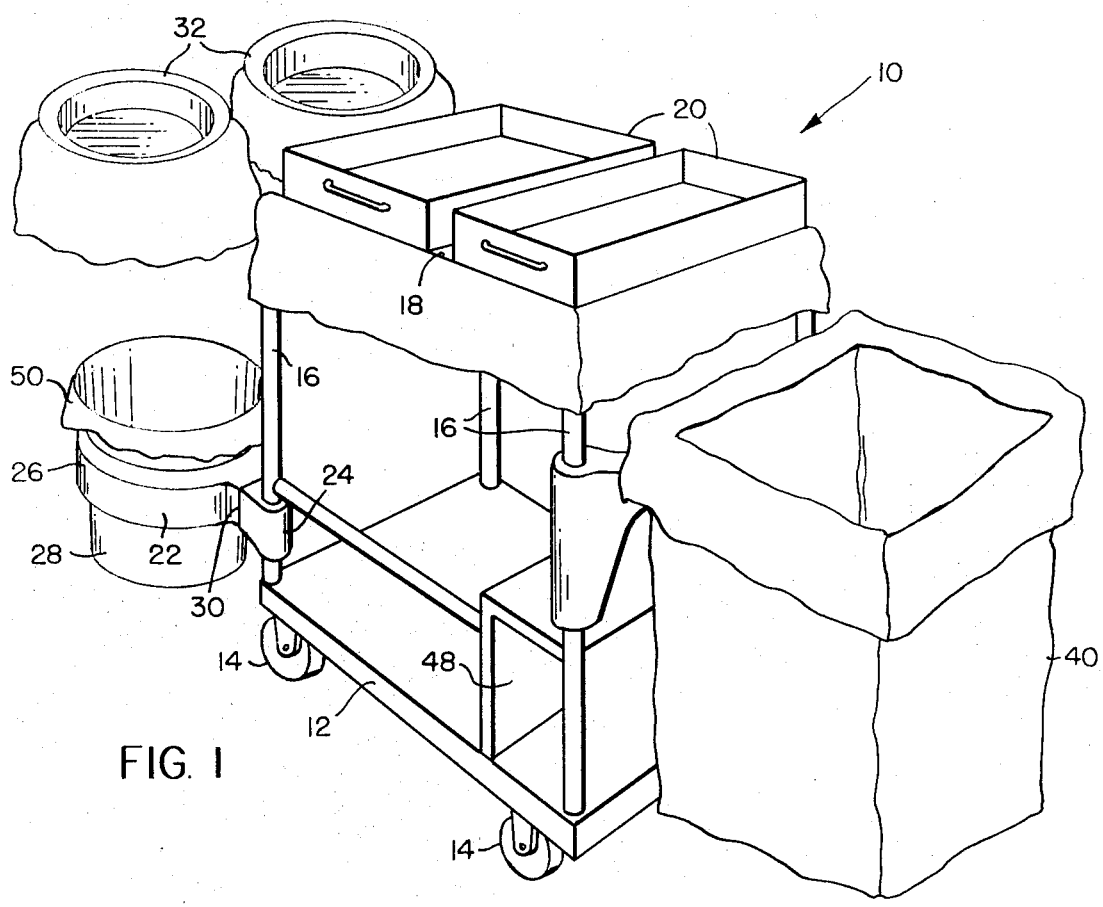
FIG. 1 is a perspective view of the supply cart in use.

Referring to the drawings, FIG. 1 shows the surgical supply cart generally indicated at 10. The cart includes a base portion 12 which is made mobile by any suitable means, such as casters 14. Upstanding from the corner of each face are upright members 16. Supported on the upright members is a top 18, which for all practical purposes is coextensive with the base. As shown in the Figure, top 18 is of a size sufficient to accommodate one or more conventional surgical trays 20 which can be loaded with various surgical supplies (not shown) such as the surgical instruments, gauzes and the like.

Attached to one of the upright members 16, adjacent base 12, is a bracket 22. The bracket has two portions, a first portion 24 which is journeled to the upright member to permit movement of bracket 22 in a horizontal plane and a second annular portion 26 which carries a waste or "kick" pail 28. Bracket portions 24 and 26 are joined with a swivel connection at 30 which allows portion 26 to rotate about an axis normal to the upright member 16. With this arrangement, pail 28 can be inverted by rotating bracket portion 26 about swivel 30 and the entire bracket 22 swung about upright 16 to locate the pail in an inverted position beneath top 18 as shown, for example, in FIG. 3. Inverting the pail in this manner, prevents condensate water from accumulating in the pail during a steam sterilization process. If desired the pail may be removable from bracket portion 26.

Figures 2, 3:
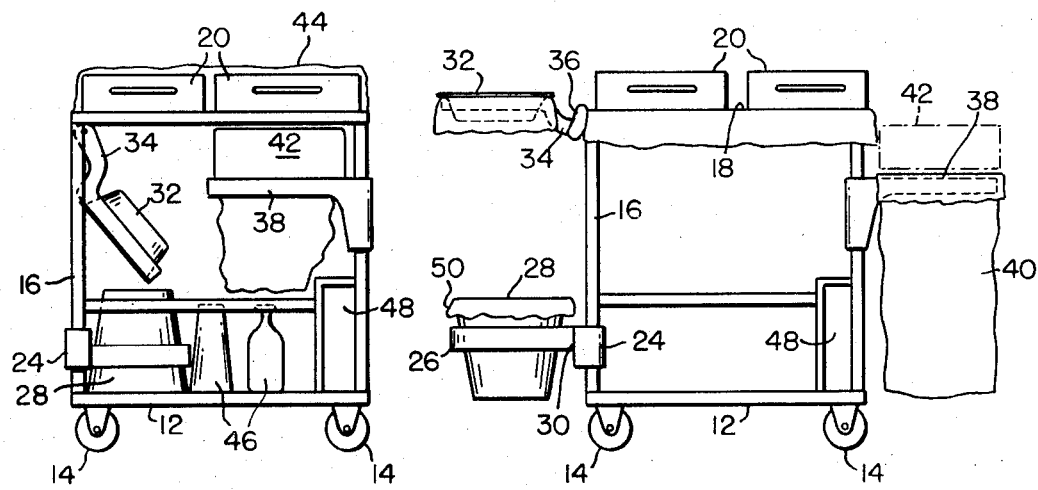
FIG. 2 is a side elevation view on a smaller scale of the cart in use.
FIG. 3 is a side elevation view showing the cart loaded with supply items for a surgical procedure and the various components of a cart in a stored position for sterilizing.

Another container, in this case, a basin 32 is supported on one end of arm member 34 (FIGS. 2 and 3). The other end of the arm member is pivotally attached beneath top 18 to permit movement of the basin in a vertical plane from the in-use position shown in FIGS. 1 and 2 to the stored position shown in FIG. 3 wherein the basin is beneath top 18 in an inverted position. The inverted position, of course, prevents water from accumulating in the basin during the steam sterilization process. Any suitable means as a manual lock 36 (FIG. 2) may be used to lock the arm member 34 in the horizontal in-use position. If desired a pair of basins 32 may be attached to the cart in this manner as shown, for example, in FIG. 1.

The supply cart may also be provided with a frame or rim 38 which is pivotally attached to one of the upright members 16 so that the rim can move a horizontal plane from the in-use position shown in FIGS. 1 and 2 to the stored position shown in FIG. 3 wherein the rim is located beneath top 18. The purpose of rim 38 is to receive a bag or hamper 40 for soiled linen such as surgical drapes and the like which are soiled during the surgical procedure. Another function of rim 38, as shown in FIG. 3, is to support a liner or "lap" pack 42 during the sterilizing process. This lap pack may contain various sterile draping and the like used during the surgical procedure.

In order to use cart 10, the various clean instruments, new supplies of linen, basins, flasks, and the like would be assembled in the central supply of the hospital on the cart according to the type of operation which is scheduled. Various linen overwraps 44 are then draped on the cart in order to provide, generally, the arrangement shown in FIG. 3. In this respect, the various instruments and other assembly material are arranged in trays 20 and the trays draped with overwraps 44. Lap pack 42 is assembled and located on frame 38. Pail 28 and basin 32 are moved to their stored position beneath cart top 18. If required, various other items 46, such as vacuum bottles, clean-up solutions and the like are placed on base 12 of the supply cart. As shown in the Figure, the cart is also provided with a compartment 48 for containing a clean-up mop and other like materials used for wiping down the operating room after the surgery.

The supply cart so arranged is then simply wheeled into an appropriate steam sterilizer where the entire cart and its load are sterilized. The various basins and pails when supported in an inverted position, as shown in FIG. 3, prevent any accumulation of condensate water during the steam sterilizing process. After the cart and its load have been sterilized, it could be stored for brief periods or sent directly to the operating room for use. Once in the operating room, frame 38 is swung to the in-use position shown in FIGS. 1 and 3 and the lap pack 42 removed, opened and the patient supplies contained therein used for preparing and draping the patient. Any suitable receptacle bag 40 is then placed in frame 38 for receiving the linens and drapes which are soiled during the surgical procedure. Sterile water basin 32 is swung out from under top 18 to the in-use position shown in FIGS. 1 and 2. These basins preferably are supplied with sterile water and/or disinfectant solutions as desired from bottles 46. The various drapes 44 are opened to expose the contents of instrument trays 20 and the kick pail 28 is swung out from beneath top 18 and bracket portion 26 swiveled to upright the waste pail. If desired, a liner 50 can be placed into the waste pail.

After the surgical procedure, various liquid and vacuum bottles are replaced on base 12 and the mop, disinfectants and other cleaning materials are removed from compartment 48 and used wipe down the operatory after which the disposable items are placed into the pail and the mop returned to compartment 48. The pail is then swung beneath the cart top but is not inverted and likewise rim 38 with its soiled linen hamper is moved back under the cart top as are basins 32. The cart may then be wheeled from the operatory and sent to a central supply department where it is sterilized if need be, cleaned, the various instruments sorted and the cart restocked for the next scheduled surgery.

Thus, it should be appreciated that the present invention accomplishes its intended objects in providing a surgical supply cart which greatly simplifies the task of preparing and presenting supplies for a surgical procedure and assures better control in maintaining equipment sterility by allowing the supplies to be assembled before hand on the cart so that the cart and its contents can be sterilized in one operation. Also, once equipment is used, all contaminated items are rolled out of the operating room, not to be tracked in again until completely re-processed and resterilized.

Having thus described the invention, what is claimed as new is:

1. A surgical supply cart capable of being loaded with supplies for use during a surgical procedure and then steam sterilized to sterilize both the cart and supplies, including a mobile base, a pluarlity of spaced upright support members on said base, and a top supported on said upright members, the improvement comprising:
    a. a container support bracket including
        i. a first portion pivoted to one of said upright members for movement in a horizontal plane; and
        ii. a second, container supporting portion pivotally attached to said first portion for movement about a horizontal axis extending axially of said first portion,
    said bracket capable of moving a container supported thereby on said first portion between a first position located outwardly from under said top and a second, inverted position located wholly beneath said top;
    b. basin support means having one end pivotally attached to said cart beneath said top for movement in a vertical plane to move a basin supported thereby between a first position extending outwardly of said top to a second inverted stored position located wholly beneath said top; and
    c. a linen bag support frame pivoted to another of said upright members for movement in a horizontal plane from a first position extending outwardly from said top to a second stored position located wholly beneath said top.

2. A surgical supply cart as in claim 1 wherein said bracket removably supports a container.

3. A surgical supply cart as in claim 1 wherein said supporting bracket is located adjacent said base.

4. A surgical supply cart as in claim 1 including lock means to hold said basin support means in a horizontal position for supporting a basin outwardly from said top.

* * * * *